(12) United States Patent
Ra et al.

(10) Patent No.: US 12,518,719 B2
(45) Date of Patent: Jan. 6, 2026

(54) DISPLAY DRIVER CIRCUIT, ELECTRONIC DEVICE INCLUDING DISPLAY DRIVER CIRCUIT, AND OPERATING METHOD OF DISPLAY DRIVER CIRCUIT

(71) Applicant: SAMSUNG ELECTRONICS CO., LTD., Suwon-si (KR)

(72) Inventors: Joongmin Ra, Suwon-si (KR); Sunyoung Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 18/121,879

(22) Filed: Mar. 15, 2023

(65) Prior Publication Data

US 2024/0013748 A1 Jan. 11, 2024

(30) Foreign Application Priority Data

Jul. 11, 2022 (KR) .................. 10-2022-0085188

(51) Int. Cl.
*G09G 5/00* (2006.01)
*G06F 3/147* (2006.01)
*G09G 5/10* (2006.01)

(52) U.S. Cl.
CPC .......... *G09G 5/006* (2013.01); *G06F 3/147* (2013.01); *G09G 5/10* (2013.01); *G09G 2310/08* (2013.01); *G09G 2320/0233* (2013.01); *G09G 2320/0626* (2013.01); *G09G 2320/0693* (2013.01); *G09G 2360/127* (2013.01)

(58) Field of Classification Search
CPC ...... G09G 5/006; G09G 5/10; G09G 2310/08; G09G 2320/0233; G09G 2320/0626; G09G 2320/0693; G09G 2360/127; G09G 2360/12; G09G 3/00; G09G 2320/043; G09G 2330/026; G09G 3/20; G09G 3/006;
(Continued)

(56) References Cited

U.S. PATENT DOCUMENTS 5,731,809 A 3/1998 Lin et al.
9,261,939 B2 2/2016 Biswas et al.
(Continued)

FOREIGN PATENT DOCUMENTS

KR 102232544 B1 3/2021

*Primary Examiner* — Chong Wu
(74) *Attorney, Agent, or Firm* — Sughrue Mion, PLLC (57) ABSTRACT

The present disclosure provides apparatuses including display driver circuits and operating methods thereof. In some embodiments, an electronic device includes a display panel, a nonvolatile memory, and a display driver circuit configured to receive frame data through a video interface channel, generate compensated frame data by compensating for the frame data by using compensation data, and send the compensated frame data to the display panel. The display driver circuit includes a display memory configured to store the compensation data, a compensation circuit configured to generate the compensated frame data from the frame data, a buffer memory, and a backup controller configured to monitor a status of the compensation circuit, and, when the compensation circuit is in an idle state, read partial data among the compensation data from the display memory, and write data present in the buffer memory in the nonvolatile memory.

20 Claims, 8 Drawing Sheets

(58) Field of Classification Search
CPC .......... G09G 3/2092; G09G 2310/0291; G06F 3/147
See application file for complete search history.

(56) References Cited

U.S. PATENT DOCUMENTS

| | | | |
|---|---|---|---|
| 9,432,298 B1* | 8/2016 | Smith | ................. H04L 49/9057 |
| 9,472,133 B2 | 10/2016 | Kim et al. | |
| 10,304,409 B2 | 5/2019 | You et al. | |
| 11,037,477 B2 | 6/2021 | Choi et al. | |
| 2020/0111405 A1* | 4/2020 | Kim | ..................... G09G 3/2092 |
| 2021/0248980 A1 | 8/2021 | Lee et al. | |
| 2021/0327103 A1 | 10/2021 | Kim et al. | |

* cited by examiner

DISPLAY DRIVER CIRCUIT, ELECTRONIC DEVICE INCLUDING DISPLAY DRIVER CIRCUIT, AND OPERATING METHOD OF DISPLAY DRIVER CIRCUIT

CROSS-REFERENCE TO RELATED APPLICATIONS

This application claims benefit of priority under 35 U.S.C. § 119 to Korean Patent Application No. 10-2022-0085188, filed on Jul. 11, 2022, in the Korean Intellectual Property Office, the disclosures of which are incorporated by reference herein in their entireties.

BACKGROUND

1. Field

The present disclosure relates to electronic devices, and more particularly, to display driver circuits, electronic devices including display driver circuits, and operating methods of the display driver circuits.

2. Description of Related Art

A related display panel may display image data such that a user is able to recognize the image data. For example, the related display panel may include pixels displaying different colors and may display the image data by adjusting the brightness of the pixels. The related display panel may select a row of pixels targeted for brightness adjustment by using a gate line and may adjust the brightness of the targeted pixels by using source lines.

Stress may accumulate in the pixels of the related display panel as a time during which the pixels display the image data elapses. The accumulated stress of the pixels may affect and/or change the brightness of the pixels. For example, when image data of a same brightness level is displayed, the brightness of the pixels may be differently displayed depending on differences of an accumulated stress of the pixels.

The related display panel may use compensation data including stress information of the pixels to compensate for the change in brightness of pixels due to the stress. That is, the influence of the stress applied to the pixels may be compensated by correcting brightness levels of image data, which are transferred to the pixels based on the stress of the pixels, based on configuration data.

SUMMARY

Embodiments of the present disclosure provide for a display driver circuit that may improve a compensation data backup speed when compared to related display devices, an electronic device including the display driver circuit, and a method for operating the display driver circuit.

According to an aspect of the present disclosure, an electronic device is provided. The electronic device includes a display panel, a nonvolatile memory, and a display driver circuit. The display driver circuit is configured to receive frame data through a video interface channel, generate compensated frame data by compensating for the frame data by using compensation data, and send the compensated frame data to the display panel. The display driver circuit includes a display memory configured to store the compensation data, a compensation circuit configured to generate the compensated frame data from the frame data, a buffer memory, and a backup controller configured to monitor a status of the compensation circuit. The backup controller is further configured to, when the compensation circuit is in an idle state, read partial data among the compensation data from the display memory to store the partial data in the buffer memory, and write data present in the buffer memory in the nonvolatile memory.

According to an aspect of the present disclosure, a display driver circuit is provided. The display driver circuit includes a video interface circuit configured to receive frame data through a video interface channel, a display memory configured to store compensation data received from an external memory, a compensation circuit configured to generate compensated frame data from the frame data based on the compensation data, a driver configured to send the compensated frame data to an external display panel, a buffer memory, and a backup controller configured to monitor a status of the compensation circuit. The backup controller is further configured to, when the compensation circuit is in an idle state, read partial data among the compensation data from the display memory to store the partial data in the buffer memory, and request the external memory to write data stored in the buffer memory.

According to an aspect of the present disclosure, an operating method of a display driver circuit is provided. The operating method includes monitoring, at the display driver circuit, a status of a compensation circuit of the display driver circuit. The compensation circuit is configured to compensate for frame data based on compensation data. The operating method further includes reading, at the display driver circuit, partial data of the compensation data from a display memory, when the compensation circuit is in an inactive state. The operating method further includes storing the partial data in a buffer memory.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

Reference throughout the present disclosure to "one embodiment," "an embodiment," or similar language may indicate that a particular feature, structure, or characteristic described in connection with the indicated embodiment is included in at least one embodiment of the present solution. Thus, the phrases "in one embodiment", "in an embodiment," and similar language throughout this disclosure may, but do not necessarily, all refer to the same embodiment.

Below, embodiments of the present disclosure will be described in detail and clearly to such an extent that an ordinary one in the art easily implements the present disclosure.

Figure 1:
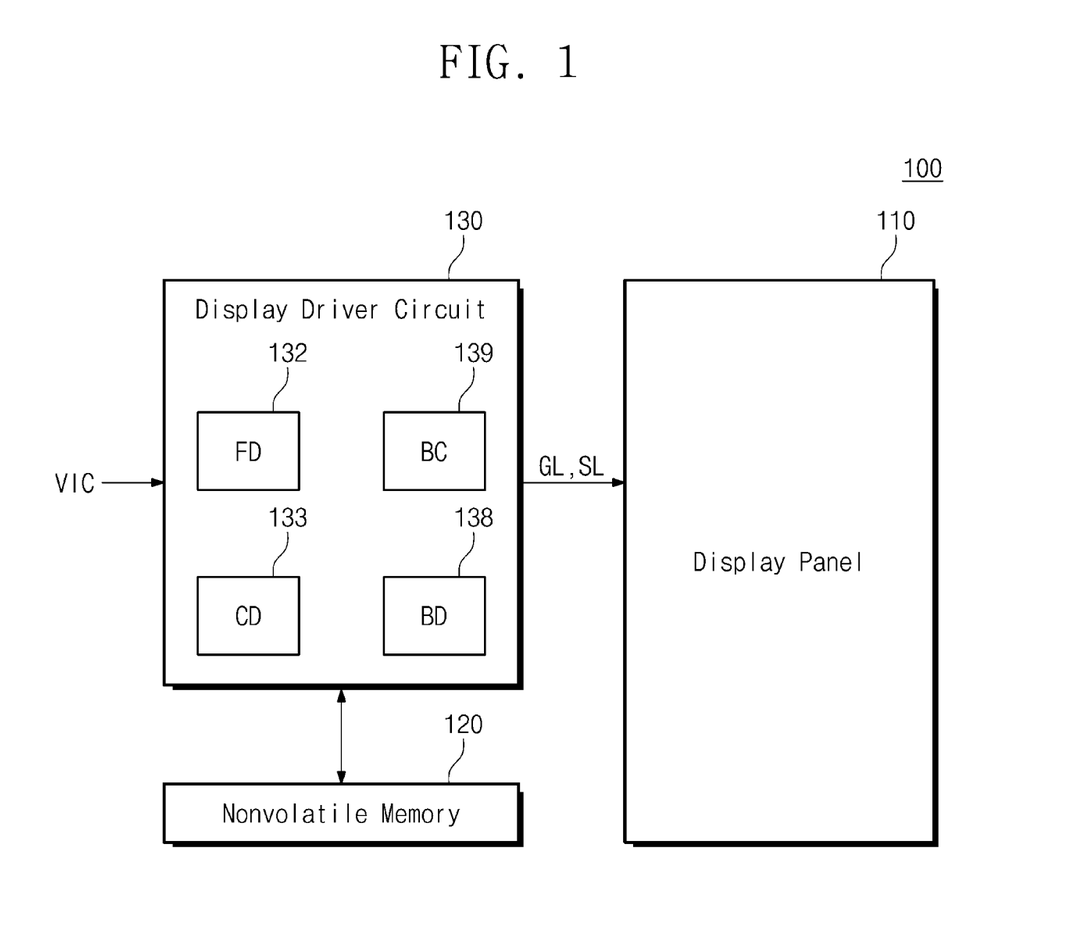
FIG. 1 is a diagram illustrating an electronic device, according to an embodiment.

FIG. 1 illustrates an electronic device 100 according to an embodiment of the present disclosure. Referring to FIG. 1, the electronic device 100 may include a display panel 110, a nonvolatile memory 120, and a display driver circuit 130.

The display panel 110 may include pixels arranged in rows and columns (not shown). The rows of the pixels may be connected with gate lines GL and the columns of the pixels may be connected with source lines SL. The pixels may display various colors such as, but not limited to, a blue color, a green color, and a red color, and may display an image through combinations of the various colors such as the blue color, the green color, and the red color.

The nonvolatile memory 120 may be configured to store initial compensation data and/or backup compensation data. The nonvolatile memory 120 may include one of various nonvolatile memories such as, but not be limited to, a flash memory, a phase-change memory, a ferroelectric memory, and a magnetic memory.

The display driver circuit 130 may receive image data (e.g., frame data FD) from an external device through a video interface channel VIC. The display driver circuit 130 may include a frame buffer 132 configured to store the frame data FD. In some embodiments, the display driver circuit 130 may not include the frame buffer 132. In such embodiments, the frame data FD may be processed within the display driver circuit 130 in an on-the-fly manner. The frame buffer 132 may include, but not be limited to, a random access memory such as a static random access memory (SRAM) and/or a dynamic random access memory (DRAM).

When a power is turned on (e.g., power is applied), the display driver circuit 130 may read compensation data CD (e.g., the initial compensation data and/or backup compensation data) from the nonvolatile memory 120. The display driver circuit 130 may include a display memory 133 configured to load the compensation data CD. In an embodiment, the compensation data CD may be referred to as configuration data. The display memory 133 may include, but not be limited to, a random access memory such as a static random access memory (SRAM) and/or a dynamic random access memory (DRAM).

The display driver circuit 130 may compensate for the frame data FD by using the compensation data CD and may generate compensated frame data. The display driver circuit 130 may sequentially select the gate lines GL, and may provide data (e.g., data indicating a compensated brightness level), which corresponds to pixels of the selected gate line GL from among the compensated frame data, to the display panel 110 through the source lines SL.

In an embodiment, the compensation data CD may include time information of a time at which the pixels of the display panel 110 are to display an image. The compensation data CD may include an offset value for brightness adjustment obtained from the time information, calculated based on an equation for calculating a brightness level, and/or history information of pixels for calculating a brightness level. When the electronic device 100 displays an image through the display panel 110, the stress accumulated in the pixels of the display panel 110 may increase, and thus, the compensation data CD may be updated to adequately compensate for the additional accumulated stress.

The display driver circuit 130 may include a backup controller (BC) 139 configured to back up the compensation data CD stored in the display memory 133. The display driver circuit 130 may include a buffer memory 138 configured to store backup data BD. The backup controller 139 may store partial data of the compensation data CD present in the display memory 133 in the buffer memory 138 as the backup data BD.

While the display driver circuit 130 accesses the compensation data CD of the display memory 133, the backup controller 139 may not be capable of accessing the compensation data CD of the display memory 133. Alternatively or additionally, while the backup controller 139 accesses the compensation data CD of the display memory 133, the display driver circuit 130 may not be capable of accessing the compensation data CD of the display memory 133.

When the access of the display driver circuit 130 to the compensation data CD of the display memory 133 is delayed, the timing at which an image is displayed in the display panel 110 may be delayed. The above delay may cause the reduction of image quality of the display panel 110. Accordingly, the backup controller 139 according to an embodiment of the present disclosure may access the compensation data CD of the display memory 133 at a timing at which the display driver circuit 130 does not access the compensation data CD of the display memory 133 (and/or only at the corresponding timing).

Figure 2:
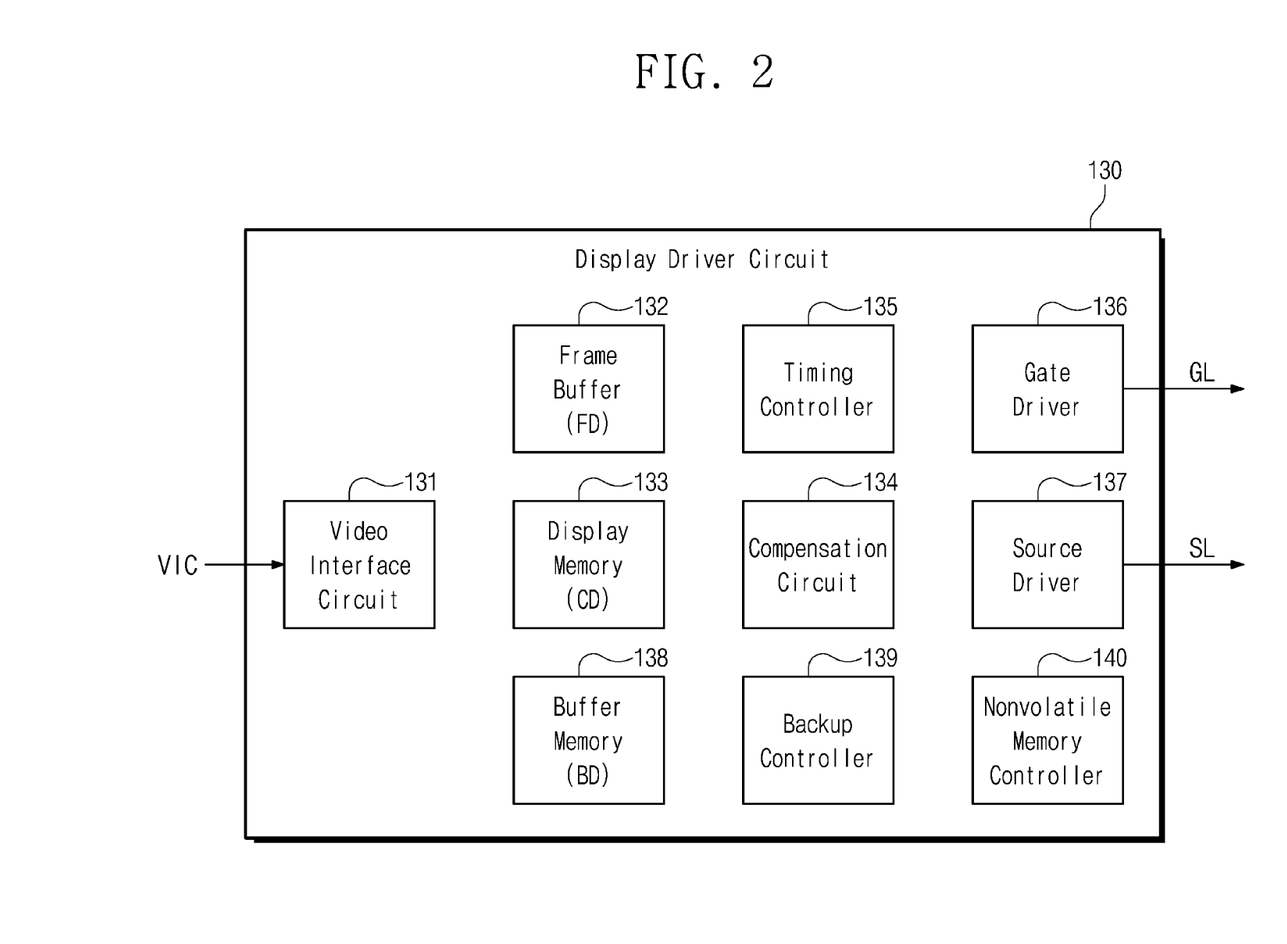
FIG. 2 is a diagram illustrating a display driver circuit of FIG. 1 in detail, according to an embodiment.

FIG. 2 is a diagram illustrating the display driver circuit 130 of FIG. 1 in further detail. Referring to FIGS. 1 and 2, the display driver circuit 130 may include a video interface circuit 131, the frame buffer 132, the display memory 133, a compensation circuit 134, a timing controller 135, a gate driver 136, a source driver 137, the buffer memory 138, the backup controller 139, and a nonvolatile memory controller 140.

The video interface circuit 131 may receive the frame data FD through the video interface channel VIC. The video interface circuit 131 may store the received frame data FD in the frame buffer 132. When the frame buffer 132 is not provided, the video interface circuit 131 may transfer the received frame data FD to the compensation circuit 134 in an on-the-fly manner. For example, the video interface circuit 131 may receive frame data based on the mobile industry processor interface (MIPI) standard (e.g., camera serial interface physical layer (C-PHY) and/or display serial interface physical layer (D-PHY)).

The frame buffer 132 may store the frame data FD. The display memory 133 may store the compensation data CD. The description given with reference to the frame buffer 132 and the display memory 133 in FIG. 1 may be applied to the frame buffer 132 and the display memory 133 of FIG. 2, and thus a repeated description is omitted for clarity and conciseness.

The compensation circuit 134 may read the compensation data CD from the display memory 133 and may read the frame data FD from the frame buffer 132. The compensation circuit 134 may compensate for the frame data FD by using the compensation data CD. For example, the compensation circuit 134 may compensate for brightness levels to be displayed through the pixels of the display panel 110. The compensation circuit 134 may provide the compensated frame data to the source driver 137.

The timing controller 135 may adjust operation timings of the display driver circuit 130. For example, the timing controller 135 may control timings such that the gate driver 136 sequentially selects the gate lines GL. For another example, the timing controller 135 may control timings such that the source driver 137 sequentially selects the source lines SL.

The gate driver 136 may sequentially select the gate lines GL under control of the timing controller 135. The gate driver 136 may sequentially select the gate lines GL in a direction from the uppermost gate line to the lowermost gate line. After the lowermost gate line is selected, the gate driver 136 may again select the uppermost gate line. However, the present disclosure is not limited in this regard. For example, in some embodiments, the gate driver 136 may sequentially select the gate lines GL in a direction from the lowermost gate line to the uppermost gate line, and may return to the lowermost gate line after the uppermost gate line is selected.

Under control of the timing controller 135, the source driver 137 may adjust voltages of the source lines SL based on the compensated frame data transferred from the compensation circuit 134 (e.g., data corresponding to the currently selected gate line from among the compensated frame data). The brightness of pixels connected with the currently selected gate line may change depending on the change in the voltages of the source lines SL.

The buffer memory 138 may store the backup data BD. The backup controller 139 may read partial data among the compensation data CD present (e.g., stored) in the display memory 133 and may store the read partial data as the backup data BD in the buffer memory 138. The descriptions given with reference to the buffer memory 138 and the backup controller 139 in FIG. 1 may be applied to the buffer memory 138 and the backup controller 139 of FIG. 2, and thus a repeated description is omitted for clarity and conciseness.

The nonvolatile memory controller 140 may control the nonvolatile memory 120. For example, under control of the display driver circuit 130, the nonvolatile memory controller 140 may read the compensation data CD from the nonvolatile memory 120 and may load (or store) the compensation data CD into (or in) the display memory 133. In response to a request of the backup controller 139, the nonvolatile memory controller 140 may read the backup data BD from the buffer memory 138 and may write the backup data BD to the nonvolatile memory 120.

Without the collision with the timing at which the compensation circuit 134 accesses the compensation data CD of the display memory 133, the backup controller 139 may store partial data among the compensation data CD present in the display memory 133 in the buffer memory 138 as the backup data BD. Afterwards, the backup data BD may be written in the nonvolatile memory 120 through the nonvolatile memory controller 140. The writing of the backup data BD in the nonvolatile memory 120 may not affect the compensation operation of the compensation circuit 134, and thus, the delay may not occur with regard to an operation of writing the backup data BD in the compensation operation of the compensation circuit 134.

When the backup operation starts, the backup controller 139 may repeat the following operations until the compensation data CD of the display memory 133 (or all the compensation data CD) is backed up to the nonvolatile memory 120: (1) reading the partial data among the compensation data CD of the display memory 133; (2) writing the read data as the backup data BD in the buffer memory 138; and (3) requesting the nonvolatile memory 120 or the nonvolatile memory controller 140 to write the backup data BD.

The backup controller 139 may perform the backup operation based on a specified time period. For example, when the specified time period elapses after the backup operation is completed, the backup controller 139 may perform a next (subsequent) backup operation. Alternatively or additionally, the backup controller 139 may start the backup operations with the period of the specified time.

In an embodiment, the compensation circuit 134 may be illustrated to be one block. However, the compensation circuit 134 may be modified to perform compensation in the form of a combination of two or more different compensation operations or in the form of a compensation of two or more compensation operations.

Alternatively or additionally, the compensation circuit 134 may be implemented in the form of two or more distinguishable circuits and/or a compensation of two or more circuits. When the compensation circuit 134 is interconnected with two or more distinguishable circuits, the display memory 133 may be interconnected with two or more distinguishable memories respectively corresponding to the two or more distinguishable circuits. The two or more distinguishable memories may have distinguishable inputs and outputs and may be respectively accessed by the two or more distinguishable circuits.

In an embodiment, the display driver circuit 130 may be implemented with one integrated circuit. In another embodiment, the display driver circuit 130 may be implemented with a plurality of integrated circuits. For example, when the size of the display panel 110 increases, a plurality of gate driver circuits and/or a plurality of source driver circuits may be provided at a plurality of locations outside the display driver circuit 130.

Figure 3:
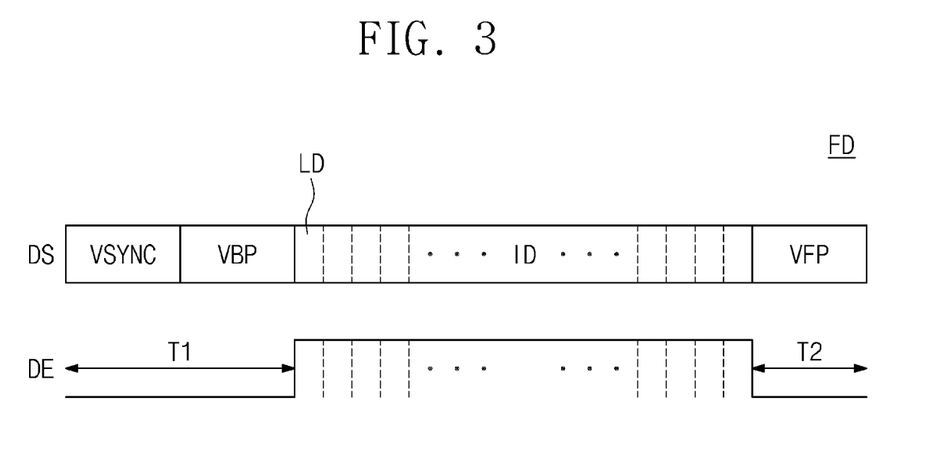
FIG. 3 is a diagram illustrating an example of frame data received from a video interface channel, according to an embodiment.

FIG. 3 is a diagram illustrating an example of the frame data FD received from the video interface channel VIC. Referring to FIGS. 1-3, the frame data FD may include a data signal DS and a data enable signal DE.

The data signal DS may include vertical synchronization VSYNC, a vertical back porch VBP, image data ID, and a vertical front porch VFP.

During a first time period T1, the data signal DS may include the vertical synchronization VSYNC and the vertical back porch VBP, and the data enable signal DE may be in an inactive state (e.g., at a low level). Because the compensation circuit 134 does not perform the compensation operation during the first time period T1, the backup controller 139 may read partial data among the compensation data CD from the display memory 133 during the first time period T1.

When the data signal DS includes the image data ID, the data enable signal DE may be in an active state (e.g., may toggle between a high level and the inactive state). The image data ID may include a plurality of line data LD. At a boundary between the line data LD, as marked by a dotted line, the data enable signal DE may toggle from the high level to the low level and from the low level to the high level.

During a second time period T2, the data signal DS may include the vertical front porch VFP, and the data enable signal DE may be in the inactive state (e.g., at the low level). Because the compensation circuit 134 does not perform the compensation operation during the second time period T2, the backup controller 139 may read partial data among the compensation data CD from the display memory 133 during the second time period T2.

Figure 4:
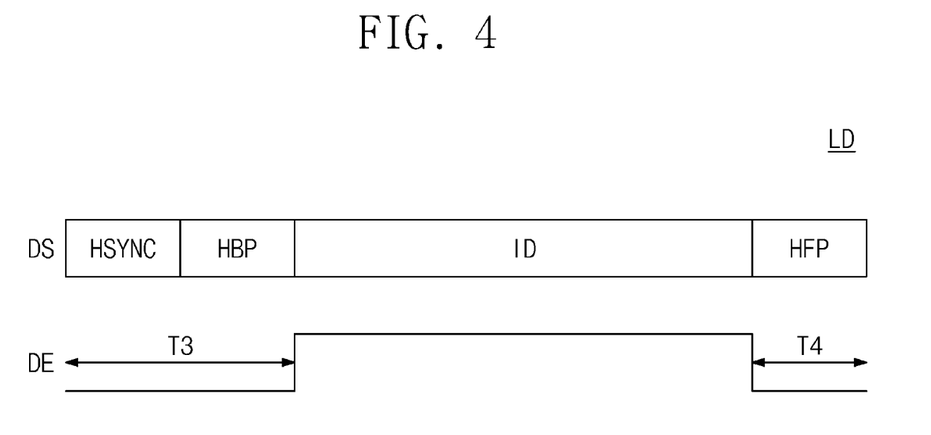
FIG. 4 is a diagram illustrating an example of line data among frame data, according to an embodiment.

FIG. 4 is a diagram illustrating an example of the line data LD among the frame data FD. Referring to FIGS. 1-4, the line data LD may include horizontal synchronization HSYNC, a horizontal back porch HBP, the image data ID, and a horizontal front porch HFP.

During a third time period T3, the data signal DS may include the horizontal synchronization HSYNC and the horizontal back porch HBP, and the data enable signal DE may be in the inactive state (e.g., at the low level). Because the compensation circuit 134 does not perform the compensation operation during the third time period T3, the backup controller 139 may read partial data among the compensation data CD from the display memory 133 during the third time period T3.

When the data signal DS includes the image data ID, the data enable signal DE may be in the active state (e.g., at the high level).

During a fourth time period T4, the data signal DS may include the horizontal front porch HFP, the data enable signal DE may be in the inactive state (e.g., at the low level). Because the compensation circuit 134 does not perform the compensation operation during the fourth time period T4, the backup controller 139 may read partial data among the compensation data CD from the display memory 133 during the fourth time period T4.

As described with reference to FIGS. 3 and 4, in the first time period T1, the second time period T2, the third time period T3, and the fourth time period T4, the compensation data CD may be read from the display memory 133 without affecting the compensation operation of the compensation circuit 134, that is, without delaying the compensation operation.

However, the third time period T3 and the fourth time period T4 may be defined by a refresh rate of the display panel 110 and the number of gate lines GL of the display panel 110, and may be very short. Accordingly, to read the compensation data CD of the display memory 133 (and/or to read partial data of the compensation data CD) during the third time period T3 and the fourth time period T4 may be significantly complicated due to timing issues.

The first time period T1 and the second time period T2 may be longer than the third time period T3 and the fourth time period T4 that may be defined by the refresh rate of the display panel 110. However, to limit the timing at which the compensation data CD is read from the display memory 133 (and/or the timing at which partial data among the compensation data CD is read) to the first time period T1 and the second time period T2 may cause the delay of a frame unit in the process of reading the compensation data CD (and/or partial data of the compensation data CD).

For example, in the case where all necessary data is not read from the display memory 133 during the first time period T1 and the second time period T2 of the specific frame data FD, the remaining data may be read in the first time period T1 and the second time period T2 of the next frame data FD. When the delay of the frame unit is accumulated, the backup operation associated with the compensation data CD of the display memory 133 may be delayed as much as several to tens of frames, thereby making the backup speed low.

The display driver circuit 130, according to an embodiment of the present disclosure, may attempt to read the compensation data CD at all possible timings, not the given timings. Alternatively or additionally, the display driver circuit 130 may set the amount of data, which is read once from the display memory 133, to a minimum read unit of the display memory 133. Accordingly, the compensation operation may be prevented from being delayed due to the operation where the compensation data CD of the display memory 133 is being backed up.

Figure 5:
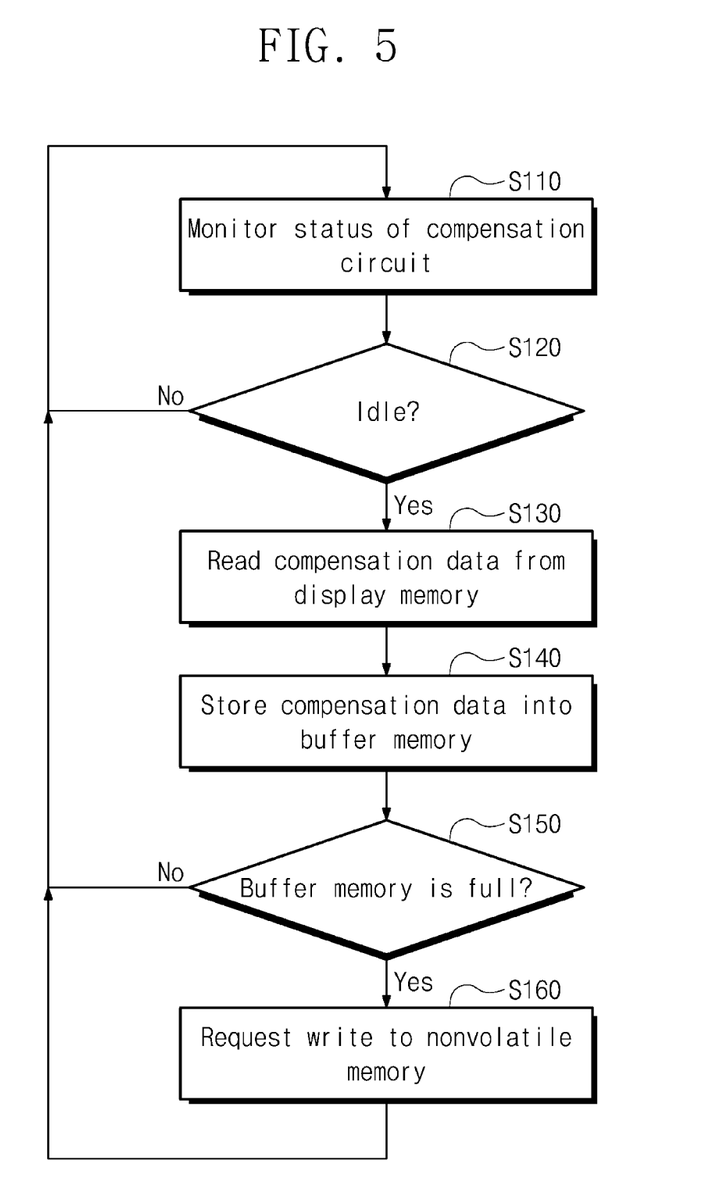
FIG. 5 is a diagram illustrating an example where a backup controller backs compensation data of a display memory up to a nonvolatile memory, according to an embodiment.

FIG. 5 is a diagram illustrating an example where the backup controller 139 backs the compensation data CD of the display memory 133 up to the nonvolatile memory 120. Referring to FIGS. 1-5, in operation S110, the backup controller 139 may monitor the status of the compensation circuit 134.

When the backup controller 139 determines, in operation S120, that the compensation circuit 134 is not in the idle state (No at operation S120), the backup controller 139 may continue to monitor the status of the compensation circuit 134 (e.g., may return to perform operation S110). When the compensation circuit 134 is in the idle state (Yes at operation S120), regardless of whether the current timing is the first time period T1, the second time period T2, the third time period T3, or the fourth time period T4, in operation S130, the backup controller 139 may read the compensation data CD (e.g., partial data among the compensation data CD) from the display memory 133.

For example, the backup controller 139 may read the partial data, which corresponds to the minimum read unit of the display memory 133, from among the compensation data CD from the display memory 133. For another example, the display memory 133 may be accessed as much as the number of times corresponding to a burst length BL capable of adjusting the given number of bits. The backup controller 139 may read the given number of bits from the display memory 133 up to the number of times corresponding to the burst length BL. For example, if the burst length BL is five, the backup controller 139 may read the given number of bits from the display memory 133 up to five times.

While the backup controller 139 reads the partial data among the compensation data CD from the display memory 133, the compensation circuit 134 may not be capable of accessing the compensation data CD of the display memory 133. When the backup controller 139 completes the operation of reading the partial data among the compensation data CD from the display memory 133, the compensation circuit 134 may regain access to the compensation data CD of the display memory 133. Because the backup controller 139 reads the partial data among the compensation data CD from the display memory 133 by the minimum read unit of the display memory 133, a time period during which the compensation circuit 134 may not be capable of accessing the display memory 133 may be minimized. Accordingly, the delay of the compensation operation may be prevented.

In an embodiment, the determining of whether the compensation circuit 134 is in the idle state may include determining that the compensation circuit 134 is accessing the display memory 133 and/or determining whether the compensation circuit 134 is performing any other operation even though not accessing the display memory 133. The backup controller 139 may monitor the status of the compensation circuit 134 by monitoring the communications between the compensation circuit 134 and the display memory 133, by monitoring a resource (e.g., a power and/or a computing power) consumed by the compensation circuit 134, and/or by receiving a signal from the compensation circuit 134, which may indicate whether the compensation circuit 134 is in the idle state.

In operation S140, the backup controller 139 may store the compensation data CD (and/or the partial data among the compensation data CD) in the buffer memory 138 as the backup data BD (and/or the partial data among the backup data BD).

In operation S150, the backup controller 139 may determine whether the buffer memory 138 is full. For example, the backup controller 139 may determine whether the entire storage capacity of the buffer memory 138 is used. In an embodiment, the storage capacity of the buffer memory 138 may correspond to a write unit of the nonvolatile memory 120. When the nonvolatile memory 120 is a flash memory, the storage capacity of the buffer memory 138 may correspond to one page (and/or one super page) of the flash memory. Accordingly, when the buffer memory 138 is full (Yes at operation S150), the backup controller 139 may determine that data for the write operation of the nonvolatile memory 120 is to be collected (operation S160).

When the backup controller 139 determines that the buffer memory 138 is not full (No at operation S150), the backup controller 139 may return to monitor the status of the compensation circuit 134 (e.g., return to perform operation S110). When the backup controller 139 determines that the buffer memory 138 is full (Yes at operation S150), the backup controller 139 may request the nonvolatile memory controller 140 to write the backup data BD collected in the buffer memory 138 to the nonvolatile memory 120. The nonvolatile memory controller 140 may request (or direct) the nonvolatile memory 120 to write the backup data BD collected in the buffer memory 138.

In an embodiment, the storage capacity of the buffer memory 138 may correspond to the write unit of the nonvolatile memory 120. In this case, operation S150 may be modified to determine whether the capacity of the backup data BD collected in the buffer memory 138 reaches the write unit of the nonvolatile memory 120.

In an embodiment, in the backup operation, the backup controller 139 may repeat the following operations until the compensation data CD present (e.g., stored) in the display memory 133 (and/or all the compensation data CD) is backed up to the nonvolatile memory 120: (1) reading the partial data among the compensation data CD from the display memory 133; (2) collecting the data read from the display memory 133 in the buffer memory 138 as the backup data BD; and (3) requesting the nonvolatile memory 120 to write the backup data BD collected in the buffer memory 138.

In an embodiment, the backup controller 139 may perform the backup operation based on the specified time period. For example, when the specified time period elapses after the backup operation is completed, the backup controller 139 may start a next backup operation. Alternatively or additionally, the backup controller 139 may start the backup operations with the specified time period.

Figure 6:
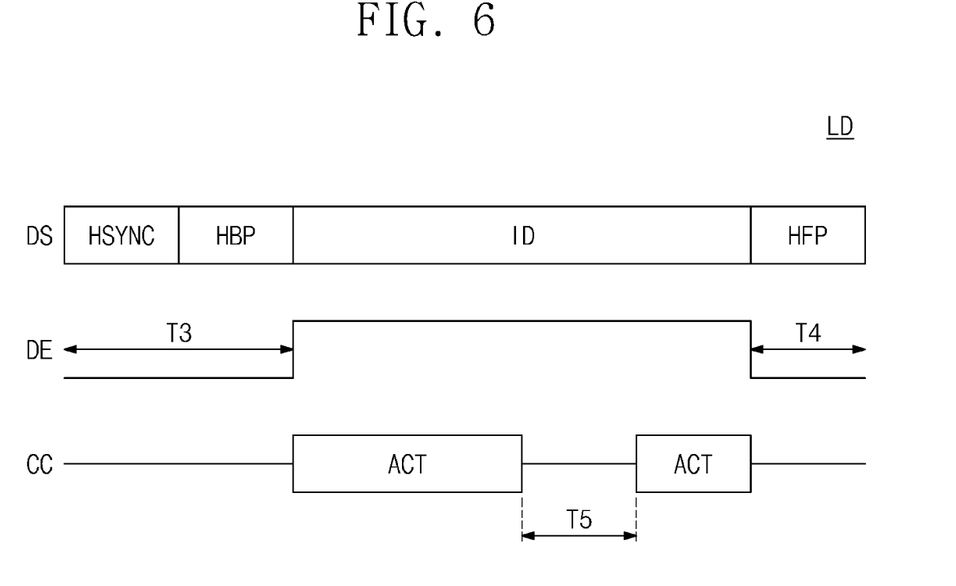
FIG. 6 is a diagram illustrating an example where a compensation circuit operates in response to line data, according to an embodiment.

FIG. 6 is a diagram illustrating an example where a compensation circuit CC operates in response to the line data LD. FIG. 6 additionally shows the status of the compensation circuit CC in addition to the line data LD of FIG. 4. Referring to FIGS. 1-3 and 6, when the line data LD includes the image data ID, the data enable signal DE may be activated. The compensation circuit CC may enter an active state ACT for the purpose of compensating for the image data ID.

When the data enable signal DE is activated, the compensation circuit CC may be in the idle state, and not the active state ACT. For example, the compensation circuit CC may be in the idle state in a fifth time period T5. The backup controller 139 according to an embodiment of the present disclosure may read the partial data among the compensation data CD from the display memory 133 even in the fifth time period T5 where the data enable signal DE is activated, in addition to the first time period T1, the second time period T2, the third time period T3, and the fourth time period T4. Because the timing for accessing the display memory 133 is extended, the backup speed (e.g., the speed at which the backup operation is performed) may be improved, and thus the backup time may be shortened.

Alternatively or additionally, the backup controller 139 according to an embodiment of the present disclosure may read the partial data among the compensation data CD from the display memory 133 at the timing where the compensation circuit CC is actually in the idle state, not the given timings. Accordingly, it may be possible to avoid the collision of the access of the compensation circuit 134 to the display memory 133 and the access of the backup controller 139 to the display memory 133.

Figure 7:
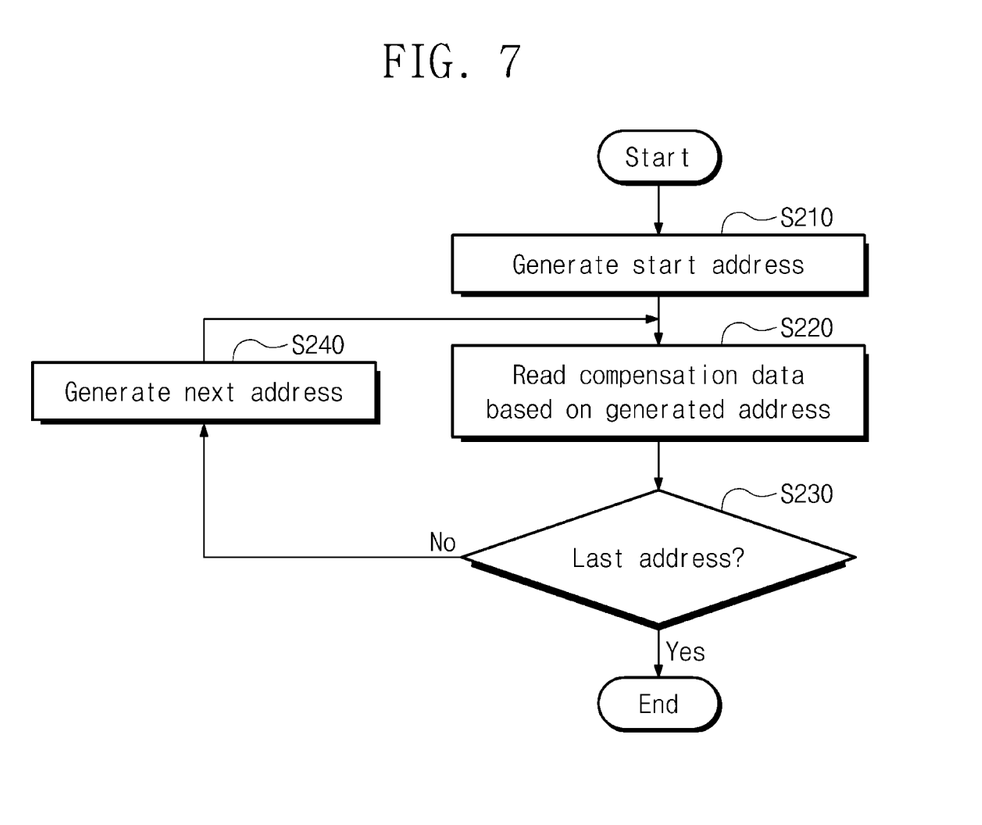
FIG. 7 is a diagram illustrating an example where a backup controller generates an address of a display memory in a backup operation, according to an embodiment.

FIG. 7 is a diagram illustrating an example where the backup controller 139 generates an address of the display memory 133 in the backup operation. Referring to FIGS. 1, 2, and 7, in operation S210, the backup controller 139 may generate a start address of the display memory 133.

In operation S220, the backup controller 139 may read the compensation data CD (e.g., the partial data among the compensation data CD) from the display memory 133 based on the generated address (e.g., when the compensation circuit 134 is in the idle state). The backup controller 139 may read the partial data, which corresponds to the minimum read unit of the display memory 133, from among the compensation data CD from the display memory 133.

In operation S230, the backup controller 139 may determine whether the generated address is the last address. For example, the backup controller 139 may determine whether the generated address is the last address of the display memory 133 and/or whether the generated address is the last address of the display memory 133, at which the compensation data CD is stored.

When the backup controller 139 determines that the generated address is not the last address, in operation S240, the backup controller 139 may generate a next address. For example, the backup controller 139 may generate the next address by increasing the current address by the minimum read unit of the display memory 133. After generating the next address, the backup controller 139 may return perform operation S220.

When the backup controller 139 determines that the generated address is the last address, the read phase of the backup operation associated with the compensation data CD stored in the display memory 133 may be completed. Accordingly, the backup controller 139 may terminate the generation of the address of the display memory 133. In an embodiment, the backup controller 139 may include an address counter configured to count the address of the display memory 133.

Figure 8:
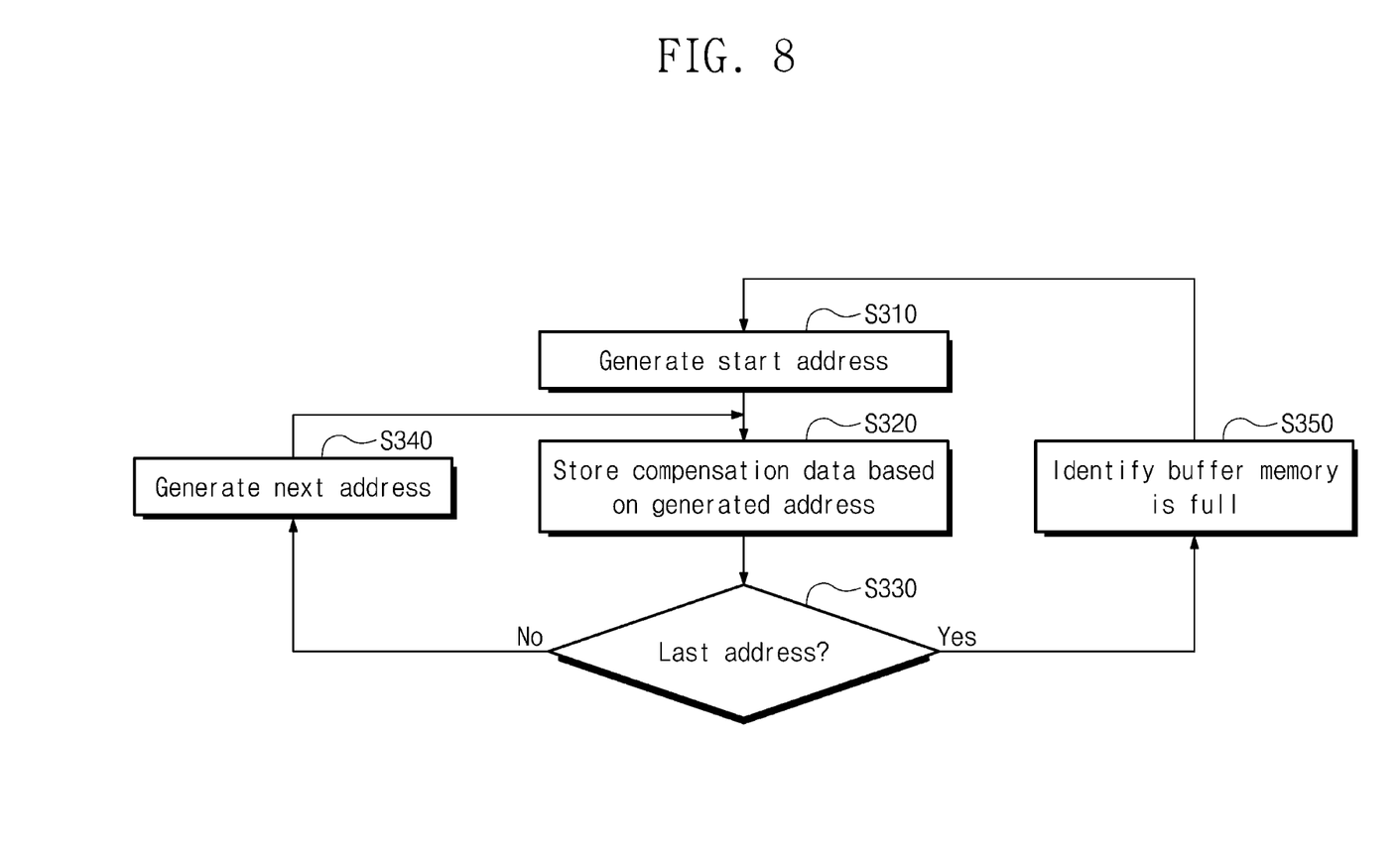
FIG. 8 is a diagram illustrating an example where a backup controller generates an address of a buffer memory in a backup operation, according to an embodiment.

FIG. 8 is a diagram illustrating an example where the backup controller 139 generates an address of the buffer memory 138 in the backup operation. Referring to FIGS. 1, 2, and 8, in operation S310, the backup controller 139 may generate a start address of the buffer memory 138.

In operation S320, the backup controller 139 may write data read from the display memory 133 to the buffer memory 138 based on the generated address. The backup controller 139 may write the partial data read based on the minimum read unit of the display memory 133 to the buffer memory 138. In an embodiment, the minimum write unit of the buffer memory 138 may be less than or equal to the minimum read unit of the display memory 133.

In operation S330, the backup controller 139 may determine whether the generated address is the last address. For example, the backup controller 139 may determine whether the generated address is the last address of the buffer memory 138 or whether the generated address is the last address of the accumulated data corresponding to the write unit of the nonvolatile memory 120 in the buffer memory 138.

When the backup controller 139 determines that the generated address is not the last address, in operation S340, the backup controller 139 may generate a next address. For example, the backup controller 139 may generate the next address by increasing the current address as much as the minimum read unit of the display memory 133. After generating the next address, the backup controller 139 may return to perform operation S320.

When the backup controller 139 determines that the generated address is the last address, the backup controller 139 may identify that the storage capacity of the buffer memory 138 is full. Alternatively or additionally, when the backup controller 139 determines that the generated address is the last address, the backup controller 139 may identify that the capacity of the backup data BD stored in the buffer memory 138 corresponds to the write unit of the nonvolatile memory 120. Accordingly, the backup controller 139 may request the nonvolatile memory 120 (and/or the nonvolatile memory controller 140) to write the backup data BD present in the buffer memory 138 to the nonvolatile memory 120.

After the backup controller 139 requests to write the backup data BD present in the buffer memory 138 or after the backup data BD present in the buffer memory 138 is written in the nonvolatile memory 120, the backup controller 139 may identify the backup data BD present in the buffer memory 138 as invalid data. The backup controller 139 may return to operation S310 and may overwrite the data read from the display memory 133 from the start address of the buffer memory 138.

In an embodiment, the operations described with reference to FIG. 8 may be repeated until the backup operation is completed. In an embodiment, the backup controller 139 may include an address counter configured to count the address of the buffer memory 138.

Figure 9:
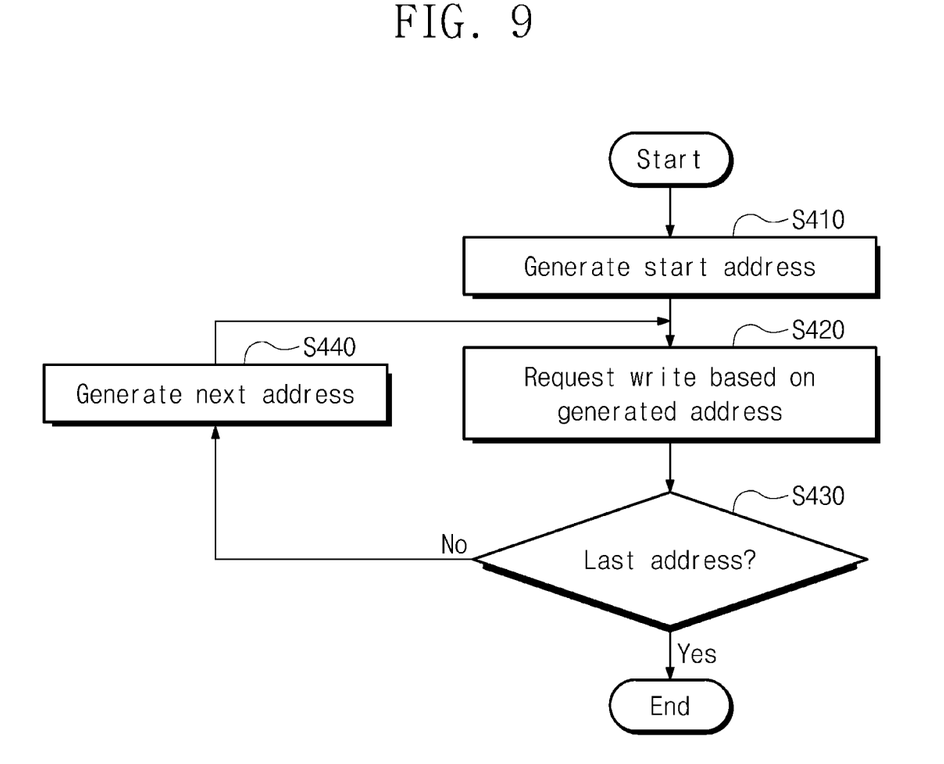
FIG. 9 is a diagram illustrating an example where a backup controller generates an address of a nonvolatile memory in a backup operation, according to an embodiment.

FIG. 9 is a diagram illustrating an example where the backup controller 139 generates an address (e.g., a logical address) of the nonvolatile memory 120 in the backup operation. Referring to FIGS. 1, 2, and 9, in operation S410, the backup controller 139 may generate a start address of the nonvolatile memory 120.

In operation S420, the backup controller 139 may request the nonvolatile memory controller 140 to write the backup data BD based on the generated address. The nonvolatile memory controller 140 may translate the logical address received from the backup controller 139 into a physical address of the nonvolatile memory 120 and may request the nonvolatile memory 120 to write the backup data BD based on the physical address.

In operation S430, the backup controller 139 may determine whether the generated address is the last address. For example, the backup controller 139 may determine whether the generated address is the last logical address of the nonvolatile memory 120 or whether the generated address is the last logical address of the nonvolatile memory 120, at which the compensation data CD is stored.

When the backup controller 139 determines that the generated address is not the last logical address, in operation S440, the backup controller 139 may generate a next logical address. For example, the backup controller 139 may generate the next logical address by increasing the current logical address as much as the write unit of the nonvolatile memory 120. After generating the next address, the backup controller 139 may return to perform operation S420.

When the backup controller 139 determines that the generated address is the last logical address, the write phase of the backup operation associated with the compensation data CD stored in the display memory 133 may be completed. Accordingly, the backup controller 139 may terminate the generation of the logical address of the nonvolatile memory 120. In an embodiment, the backup controller 139 may include an address counter configured to count the logical address of the nonvolatile memory 120.

Figure 10:
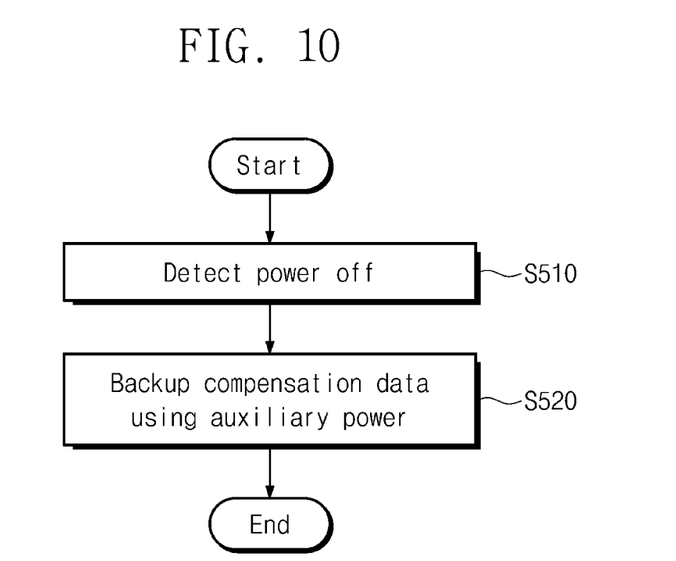
FIG. 10 is a diagram illustrating an example of an operating method of a display driver circuit in power-off, according to an embodiment.

FIG. 10 is a diagram illustrating an example of an operating method of the display driver circuit 130 in power-off. Referring to FIGS. 1, 2, and 10, in operation S510, the display driver circuit 130 may detect a power-off event (e.g., a normal power-off event and/or a sudden power-off event). For example, the display driver circuit 130 may detect the power-off event by receiving a power-off signal through the video interface channel VIC and/or by receiving power-off image data through the video interface channel VIC.

In operation S520, the display driver circuit 130 may back the compensation data CD up by using an auxiliary power. For example, the backup controller 139 may continuously read the compensation data CD from the display memory 133 regardless of whether the compensation circuit 134 is in the idle state. The backup controller 139 may read the compensation data CD from the display memory 133 by the minimum read unit of the display memory 133 or a read unit larger than the minimum read unit. The backup controller 139 may store the read compensation data CD in the buffer memory 138.

When the backup data BD corresponding to the write unit of the nonvolatile memory 120 is collected in the buffer memory 138, the nonvolatile memory 120 may request the nonvolatile memory controller 140 to write the backup data BD. The operations of reading the compensation data CD, storing the backup data BD, requesting the nonvolatile memory controller 140 to write the backup data BD may be continuously performed regardless of whether the compensation circuit 134 is in the idle state.

In an embodiment, the auxiliary power may include a long-term power source, which may retain power in the long term, such as, but not limited to, a battery and/or a short-term power source, which may retain power in the short term, such as, but not limited to, a super capacitor or a tantalum capacitor.

Figure 11:
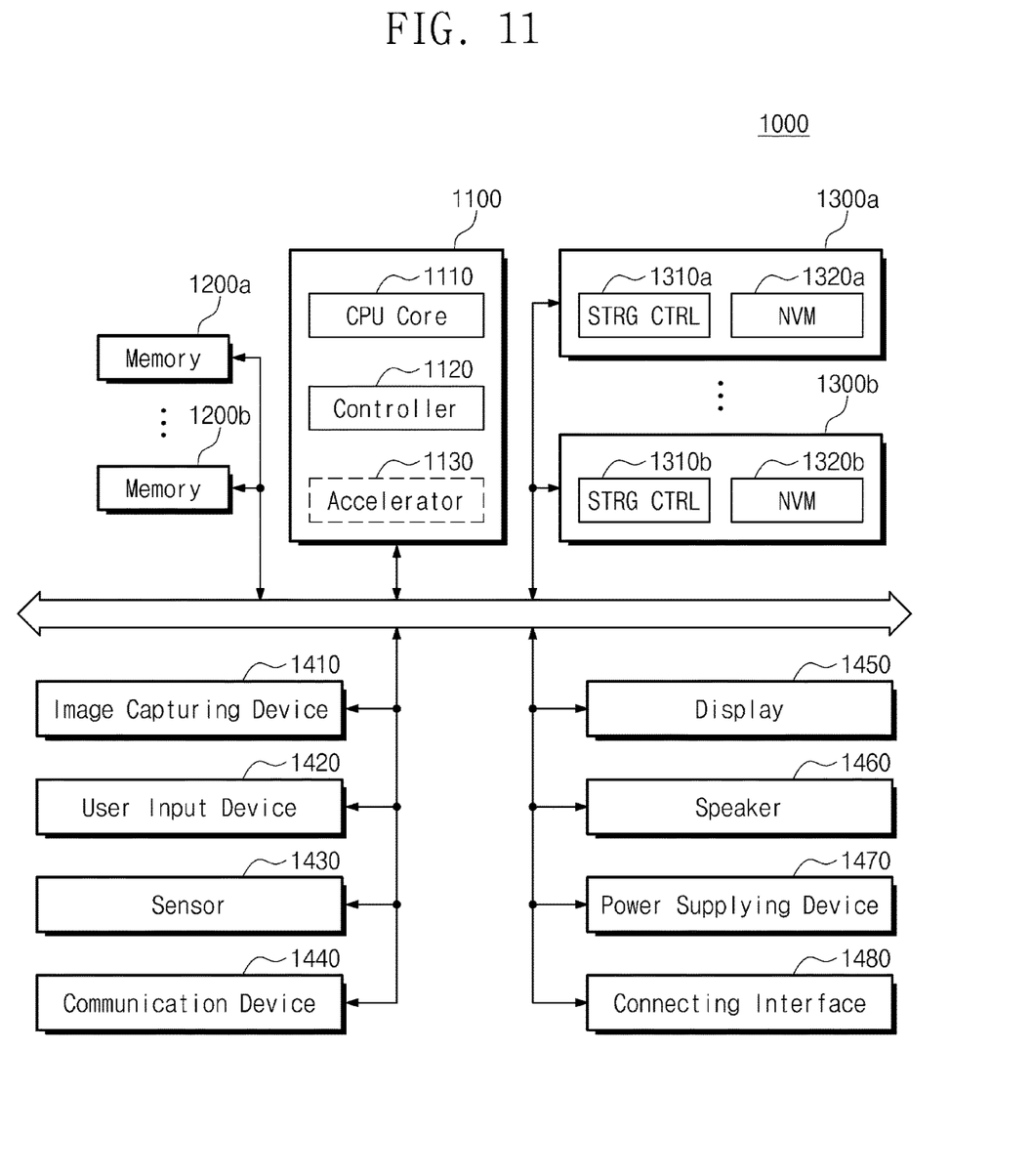
FIG. 11 is a diagram illustrating a system, according to an embodiment.

FIG. 11 is a diagram of a system 1000 to which a storage device is applied, according to an embodiment. The system 1000 of FIG. 11 may include a mobile system, such as a portable communication terminal (e.g., a mobile phone), a smartphone, a tablet, a personal computer (PC), a wearable device, a healthcare device, or an Internet of things (IOT) device. However, the system 1000 of FIG. 11 may not necessarily be limited to the mobile system and may be a PC, a laptop computer, a server, a media player, and/or an automotive device (e.g., a navigation device).

Referring to FIG. 11, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, and/or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and non-volatile memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that is described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include, but not be limited to, a camera, a camcorder, a webcam, and/or a combination thereof.

The user input device 1420 may receive various types of data input by a user of the system 1000 and include, but not be limited to, a touch pad, a keypad, a keyboard, a mouse, a microphone, and/or a combination thereof.

The sensor 1430 may detect various types of physical quantities, which may be obtained from the outside of the system 1000, and convert the detected physical quantities into electric signals. The sensor 1430 may include, but not be limited to, a temperature sensor, a pressure sensor, an illuminance sensor, a position sensor, an acceleration sensor, a biosensor, a gyroscope sensor, and/or a combination thereof.

The communication device 1440 may transmit and receive signals between other devices outside the system 1000 according to various communication protocols. The communication device 1440 may include, but not be limited to, an antenna, a transceiver, a modem, and/or a combination thereof.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as, but not limited to, advanced technology attachment (ATA), serial ATA (SATA), external SATA (e-SATA), small computer small interface (SCSI), serial attached SCSI (SAS), peripheral component interconnection (PCI), PCI express (PCIe), NVMe, Institute of Electrical and Electronics Engineers (IEEE) 1394 standard, a universal serial bus (USB) interface, a secure digital (SD) card interface, a multi-media card (MMC) interface, an eMMC interface, a UFS interface, an embedded UFS (eUFS) interface, a compact flash (CF) card interface, and/or a combination thereof.

In an embodiment, the electronic device 100 described with reference to FIGS. 1 to 10 may be included in the display 1450.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, compensation data is read from a memory by a minimum read unit while a compensation circuit(s) is in an idle state. Accordingly, a display driver circuit improving a compensation data backup speed without delaying a compensation operation of a compensation circuit, an electronic device including the display driver circuit, and an operating method of the display driver circuit are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device, comprising:
a display panel;
a nonvolatile memory; and
a display driver circuit configured to receive frame data through a video interface channel, to generate compensated frame data by compensating for the frame data by using compensation data, and to send the compensated frame data to the display panel,
wherein the display driver circuit comprises:
a display memory configured to store the compensation data;
a compensation circuit configured to generate the compensated frame data from the frame data;
a buffer memory; and
a backup controller configured to monitor a status of the compensation circuit,
wherein the backup controller is further configured, based on the compensation circuit being in an idle state, to:
read partial data among the compensation data from the display memory,
store the partial data in the buffer memory, and
write data present in the buffer memory in the nonvolatile memory.

2. The electronic device of claim 1, wherein the display driver circuit is further configured, based on power being applied to the display driver circuit, to read the compensation data from the nonvolatile memory, and to load the compensation data in the display memory.

3. The electronic device of claim 1, wherein the backup controller is further configured to read the partial data once from the display memory based on a minimum read unit of the display memory.

4. The electronic device of claim 1, wherein a capacity of the buffer memory corresponds to a write unit of the nonvolatile memory.

5. The electronic device of claim 4, wherein the backup controller is further configured to write the data present in the buffer memory in the nonvolatile memory in response to the capacity of the buffer memory being full.

6. The electronic device of claim 5, wherein the backup controller is further configured to, after the data present in the buffer memory is written in the nonvolatile memory, identify the data present in the buffer memory as invalid data.

7. The electronic device of claim 5, wherein the backup controller is further configured to:
store the partial data in the buffer memory based on an address of the buffer memory; and
increase the address of the buffer memory after storing the partial data in the buffer memory.

8. The electronic device of claim 7, wherein the backup controller is further configured to identify that the capacity of the buffer memory is full, in response to the address of the buffer memory, at which the partial data is written, being a last address of the buffer memory.

9. The electronic device of claim 1, wherein the backup controller is further configured to write the data present in the buffer memory in the nonvolatile memory in response to a capacity of the data stored in the buffer memory reaching a write unit of the nonvolatile memory.

10. The electronic device of claim 1, wherein the backup controller is further configured, until the compensation data stored in the display memory is backed up to the nonvolatile memory, to:
repeat operations of sequentially increasing an address of the display memory; and
read the partial data of the compensation data based on the address of the display memory while the compensation circuit is in the idle state.

11. The electronic device of claim 10, wherein the backup controller is further configured, based on a specified time passing after the compensation data stored in the display memory has been backed up to the nonvolatile memory, back up again, to the nonvolatile memory, the compensation data stored in the display memory.

12. The electronic device of claim 10, wherein the backup controller is further configured to repeatedly start backup of the compensation data stored in the display memory at a period of a specified time.

13. A display driver circuit, comprising:
- a video interface circuit configured to receive frame data through a video interface channel;
- a display memory configured to store compensation data received from an external memory;
- a compensation circuit configured to generate compensated frame data from the frame data based on the compensation data;
- a driver configured to send the compensated frame data to an external display panel;
- a buffer memory; and
- a backup controller configured to monitor a status of the compensation circuit,
- wherein the backup controller is further configured, based on the compensation circuit being in an idle state, to:
  - read partial data among the compensation data from the display memory,
  - store the partial data in the buffer memory, and
  - request the external memory to write data stored in the buffer memory to the external memory.

14. The display driver circuit of claim 13, wherein the backup controller is further configured to read the partial data once from the display memory based on a minimum read unit of the display memory.

15. The display driver circuit of claim 14, wherein the backup controller is further configured to monitor the status of the compensation circuit after reading the partial data once from the display memory.

16. The display driver circuit of claim 14, wherein the backup controller is further configured to read the partial data from the display memory while a data enable signal of the frame data received through the video interface channel is in an active state.

17. The display driver circuit of claim 14, wherein the backup controller is further configured to read the partial data from the display memory while a data enable signal of the frame data received through the video interface channel is in an inactive state.

18. An operating method of a display driver circuit, the operating method comprising:
- monitoring, at the display driver circuit, a status of a compensation circuit of the display driver circuit, the compensation circuit being configured to compensate for frame data based on compensation data;
- reading, at the display driver circuit, partial data of the compensation data from a display memory, based on the compensation circuit being in an inactive state; and
- storing the partial data in a buffer memory.

19. The operating method of claim 18, further comprising:
- based on a capacity of the buffer memory being full, requesting an external memory to write data stored in the buffer memory to the external memory.

20. The operating method of claim 19, further comprising:
- based on the capacity of the buffer memory being full, repeating the monitoring of the status of the compensation circuit, the reading of the partial data, the storing of the partial data in the buffer memory, and the requesting of the external memory to write the data stored in the buffer memory, until the compensation data stored in the display memory is backed up.

* * * * *